(12) United States Patent
Barthes et al.

(10) Patent No.: US 12,731,800 B2
(45) Date of Patent: Sep. 8, 2026

(54) DEVICE FOR SUPPLYING PRESSURISED AIR TO A FUEL CELL CATHODE, WITH OPTIMISED COOLING

(71) Applicant: LIEBHERR-AEROSPACE TOULOUSE SAS, Toulouse (FR)

(72) Inventors: Guillaume Barthes, Toulouse (FR); James Fouragnan, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 786 days.

(21) Appl. No.: 18/019,803

(22) PCT Filed: Jul. 28, 2021

(86) PCT No.: PCT/EP2021/071198
§ 371 (c)(1),
(2) Date: Feb. 5, 2023

(87) PCT Pub. No.: WO2022/028991
PCT Pub. Date: Feb. 10, 2022

(65) Prior Publication Data

US 2023/0299314 A1 Sep. 21, 2023

(30) Foreign Application Priority Data

Aug. 4, 2020 (FR) ...................................... 2008265

(51) Int. Cl.
*H01M 8/04111* (2016.01)
*H01M 8/04082* (2016.01)
*H02K 5/18* (2006.01)

(52) U.S. Cl.
CPC .... *H01M 8/04111* (2013.01); *H01M 8/04201* (2013.01); *H02K 5/18* (2013.01); *H01M 2250/20* (2013.01)

(58) Field of Classification Search
CPC ......... H01M 8/04111; H01M 8/04201; H01M 2250/20; H02K 5/18; Y02E 60/50; Y02T 90/40
See application file for complete search history.

(56) References Cited

U.S. PATENT DOCUMENTS

2008/0070078 A1* 3/2008 Gummalla ........ H01M 8/04141 429/495
2011/0223500 A1* 9/2011 Uematsu ........... H01M 8/04014 429/415

(Continued)

FOREIGN PATENT DOCUMENTS

CN 109372775 A * 2/2019 ........ H01M 8/04111

*Primary Examiner* — Muhammad S Siddiquee
(74) *Attorney, Agent, or Firm* — CRGO Global; Steven M. Greenberg

(57) ABSTRACT

Disclosed is a device for supplying pressurised air to a cathode (110) of a fuel cell (100), comprising a compressor (12) connected to an air inlet pipe (14) and to an inlet (112) of the cathode, configured to receive air originating from the air inlet pipe (14), compress it and supply it to the cathode (110), a motor (16) configured to drive the compressor (12) and surrounded by a casing (18), a recovery turbine (26) configured to expand the water-laden air (24) originating from the outlet (114) of the cathode in order to supply this expanded air (28) via an outlet of the turbine (26).

The device is characterised in that it comprises a cooling channel (32) configured to receive at least some of the expanded air (28) so as to cool the casing (18) of the motor and the motor (16).

7 Claims, 1 Drawing Sheet

(56) References Cited

U.S. PATENT DOCUMENTS

2013/0157154 A1* 6/2013 Hausmann ........ H01M 8/04097
429/415
2014/0144139 A1* 5/2014 Alecu ........................ F02C 7/14
29/890.03
2018/0262088 A1* 9/2018 Shiraishi .................. H02K 7/14

* cited by examiner

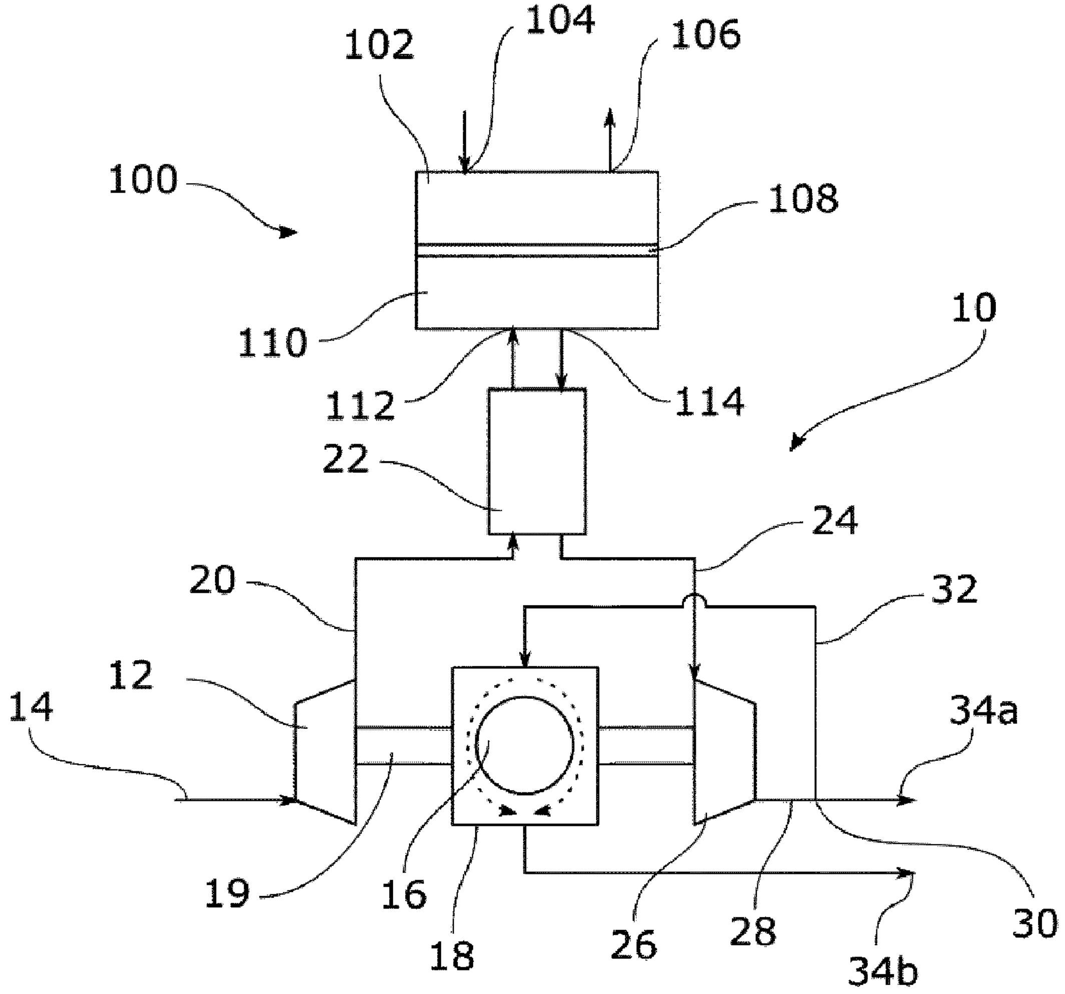
100
102
104
106
108
110
112
114
10
22
24
20
32
12
14
34a
19
16
18
26
28
30
34b

DEVICE FOR SUPPLYING PRESSURISED AIR TO A FUEL CELL CATHODE, WITH OPTIMISED COOLING

CROSS-REFERENCE TO RELATED APPLICATIONS

This application is a § 371 national phase entry of International Application No. PCT/EP2021/071198, filed Jul. 28, 2021, which claims priority to French Patent Application No. 2008265 filed on Aug. 4, 2020.

TECHNICAL FIELD OF THE INVENTION

The invention relates to a device for supplying pressurised air to the cathode of a fuel cell. In particular, the invention relates to an optimised cooling device for supplying pressurised air to the cathode of an optimised-cooling fuel cell, comprising a motorised compressor or a motorised turbocharger, which may for example be used in a vehicle, for example of the aeronautical, rail, maritime or automobile type.

TECHNOLOGICAL BACKGROUND

Pressurised air supply devices are used in several contexts, in particular in vehicles, for example in order to supply an air conditioning system or a fuel cell.

These pressurised air supply devices generally comprise a motorised compressor, and preferably a motorised turbocharger, wherein the compressor driven by the motor allows the generating of pressurised air. A significant problem raised in these devices is the cooling of the motor of the motorised compressor or motorised turbocharger.

On the one hand, in an air conditioning system, the main problem is to ensure this cooling without excessively affecting the performance and costs of the air conditioning system, in particular by limiting the use of external cold air removal and/or by not causing additional demand for pressurised air which would lead to an increase in energy consumption.

Today, there is a strong enthusiasm for equipping transport vehicles, in particular aircraft, with fuel cells, because these cells form clean, reliable and flexible energy sources.

The principle that underlies a fuel cell such as a hydrogen cell is based on the redox reaction between dihydrogen and dioxygen. These two molecules form the chemical fuel under which energy can be stored within a fuel cell application.

The fuel cell as such is therefore a two-electrode electrical generator that produces electrical energy via the oxidation, on one electrode, of a reductive fuel such as hydrogen, coupled with the reduction, on the other electrode, of an oxidant such as oxygen in the air, for example.

The oxidation-reduction reaction of the cell not only generates electricity, but also by-products such as water, heat and oxygen-depleted air.

In particular, the oxidation reaction at the anode breaks down the hydrogen molecules in contact with a catalyst in order to free the electrons and release heat. The reduction reaction at the cathode forms oxygen ions by means of the contact between the oxygen and the electrons freed by the oxidation. Moreover, the hydrogen protons recombine with the oxygen ions in order to form water.

The oxygen cathode is supplied for example via pressurised air, containing sufficient oxygen to enable the reaction.

In an aeronautical, rail, marine or automobile vehicle, pressurised air is supplied by a compressor supplied with collected air, for example from outside via an outside air inlet.

The compressor is driven by a generally electric motor to which it is connected by a shaft to rotate it.

One of the challenges of such a device for supplying pressurised air to the cathode of a fuel cell is the cooling of the drive motor of the compressor.

In particular, the cooling of the motor must be sufficiently effective to allow a power density that is compatible in terms of mass and size with integration into an on-board system, in particular a vehicle, for example an aircraft.

Furthermore, the temperature levels to which the components of the pressurised air supply device and in particular the air compressor motor are subjected must be controlled in order to prevent any malfunction, and must be compatible with the reliability levels required in on-board systems, in particular the very high levels of reliability required in an aeronautical application.

The energy consumed by cooling the motor must remain low so as not to negatively influence the overall efficiency of the system wherein it is embedded. These considerations of energy and efficiency make it possible in particular to control the overall efficiency of the fuel cell and to avoid oversizing the fuel cell system.

Finally, the efficiency must also be studied at the overall level, in particular in terms of mass and complexity, which must remain reasonable, lest the overall performance of the vehicle be penalised.

Solutions proposed in the prior art consist of cooling the motor by heat exchange with a liquid loop used as heat sink. In particular, in certain systems, in particular in the automotive field, a liquid loop is already used to cool other components and is directed towards the motor for cooling. However, this solution is complex to implement in the absence of a pre-existing liquid loop, and adds complexity and a drop in performance in an existing liquid loop due to the additional component to be cooled.

Another compressor motor cooling solution consists of ventilating with collected air, either from a fuel supply circuit or from the outside.

However, in the first case where the air is collected from the fuel supply circuit, it must have been compressed to benefit from the overpressure which creates the ventilation flow rate. This compression work is consumed for air which is not used in the fuel cell and therefore adversely affects the overall efficiency of the system.

For the second case where the air is collected from the outside, the ventilation flow rate is generally zero when the vehicle is stopped (in particular on the ground for an aircraft). Fans are used to compensate for this absence of ventilation, which adds complexity to the system, and reduces energy performance. More generally, the collection of ventilation air causes the vehicle's performance to drop.

The inventors have sought to propose a novel type of device to supply pressurised air to a fuel cell, allowing the compressor motor to be properly cooled.

Aims of the Invention

The invention aims to provide a device for supplying pressurised air to a cathode of a fuel cell that makes it possible to overcome at least one of the disadvantages of the absorption devices of the prior art.

The invention aims in particular to provide, in at least one embodiment, an energy-efficient supply device.

The invention aims in particular to provide, in at least one embodiment, a supply device usable regardless of the state of the vehicle and the outside conditions.

The invention aims in particular to provide, in at least one embodiment, an non-bulky, low-mass supply device.

DISCLOSURE OF THE INVENTION

To do this, the invention relates to a device for supplying pressurised air to at least one cathode of at least one fuel cell, comprising:

- an air inlet pipe,
- a compressor connected to the air inlet pipe and to an inlet of the cathode, configured to receive air originating from the air inlet pipe, to compress the air originating from the air inlet pipe and to supply pressurised air to the cathode,
- a motor connected to the compressor by a transmission shaft, configured to drive the compressor and surrounded by a casing,
- an energy recovery turbine connected to an outlet of the cathode, and configured to expand the water-laden air originating from the outlet of the cathode to supply expanded air via an outlet of the turbine, referred to as water-laden exhaust air, characterised in that it comprises a cooling channel connecting the outlet of the turbine and the casing of the motor, said cooling channel being configured to receive at least some of the water-laden exhaust air in the form of liquid droplets in suspension, so as to cool the motor casing and the motor with said portion of the water-laden exhaust air.

A device for supplying a cathode of a fuel cell according to the invention therefore makes it possible to provide effective, energy-efficient cooling of the compressor motor, fully drawing from the air leaving the cathode, which is generally intended to be discharged in the prior art.

The air leaving the cathode is initially expanded in an energy recovery turbine, which makes it possible to recover energy that can be used in the system in order to improve the overall energy efficiency. In addition, expansion in the turbine has the effects of reducing the temperature of the water-laden air, and of condensing the water present in the water-laden air to form droplets of water in suspension.

Thus, the water-laden exhaust air is particularly effective in serving to cool the motor casing and the motor. For example, the water-laden exhaust air is injected into a cooling circuit of the outer surface of the casing. This exhaust air, which is colder than the motor, will cool the motor casing and the motor by thermal conduction, and the water in suspension in the exhaust air will vaporise in the presence of the heat released by the motor and the motor casing, by absorbing this heat, so as to improve the cooling of the motor casing and the motor.

The use of the water-laden exhaust air therefore makes it possible to cool more efficiently than in the devices of the prior art, or to cool in the same way with a lower air flow rate, which improves the overall energy efficiency of the supply device, the fuel cell, and the vehicle wherein the supply device and the fuel cell are embedded.

The supply device does not depend on an external system for cooling its compressor motor, and may in particular, in the example of an aircraft, operate autonomously when the aircraft is on the ground.

Advantageously and according to the invention, the energy recovery turbine is arranged on the transmission shaft.

According to this aspect of the invention, the compressor, the turbine and the motor are connected by the transmission shaft and thus form a motorised turbocharger. The energy recovered by the turbine is thus used to reduce the motor energy consumption necessary to drive the compressor, which reduces the heat generated by the motor.

Advantageously and according to the invention, the supply device comprises a bifurcation arranged between the outlet of the turbine and the cooling channel, the bifurcation comprising an inlet configured to receive the water-laden exhaust air, and comprising at least two outlets, a first outlet configured to direct some of the flow of water-laden exhaust air to the cooling channel, and a second outlet configured to direct another portion of the flow of water-laden exhaust air to an exhaust outlet of the supply device.

According to this aspect of the invention, the bifurcation makes it possible to balance the pressure at the outlet of the turbine; if all of the water-laden exhaust air is sent into the cooling channel in order to cool the motor casing and the motor, a resulting pressure drop can reduce the overall performance of the system, in particular the performance of the turbine.

By allowing passive balancing of the flow rates between the cooling channel and the exhaust outlet at the bifurcation, the turbine operates at its maximum performance (the ratio between the pressure at the inlet of the turbine and the outlet of the turbine is optimised) because the pressure drop downstream from its outlet is optimised, and the cooling of the water-laden air is effective, which improves the cooling of the motor and the casing of the motor.

Advantageously and according to the invention, the bifurcation is configured so that a majority of the water suspended in the water-laden exhaust air is directed to the cooling channel.

According to this aspect of the invention, the bifurcation optimises the water distribution of the exhaust air sent to the cooling channel and the exhaust air directly discharged. The presence of suspended water in the exhaust air does not impact the pressure drop performance but is advantageous for cooling. Thus, the bifurcation is configured so that most of the water is transmitted to the cooling channel. This configuration can be done actively (controlled) or preferably passively (without intervention, which in particular limits the energy consumed and the complexity of the system). For example, the bifurcation has a geometric shape wherein the first outlet connected to the cooling channel is substantially collinear to the direction of the flow of exhaust air so that the water present in the flow is mainly directed toward this outlet, the second outlet being oriented at a different angle such that the water is preferably directed toward the first outlet.

Advantageously and according to the invention, the casing of the motor comprises cooling fins.

According to this aspect of the invention, the fins make it possible to maximise the cooling of the motor and the casing. The fins are made of a heat-conducting material to maximise heat exchanges.

According to other variants of the invention, any other device improving the heat exchange can be added to the motor casing.

Advantageously and according to the invention, the pressurised air consumer is a cathode of a fuel cell, the inlet of the pressurised air consumer being an inlet of the cathode and the outlet of the pressurised air consumer being an outlet from the cathode, and the air consumed being water-laden air.

According to this aspect of the invention, the cooling of the motor and the motor casing is particularly effective when the pressurised air consumer is the cathode of a fuel cell, since the air leaving the cathode is water-laden due to the reaction taking place in the cathode. The device for supplying pressurised air to a fuel cell cathode according to the invention is therefore particularly advantageous for these cooling capabilities of the motor and of the motor casing, and for its autonomy, which for example makes it possible, in a vehicle such as an aircraft, to effectively cool the motor and the casing of the motor as soon as the fuel cell is in operation and even if the vehicle is stationary (on the ground for an aircraft).

The invention also relates to a method supplying pressurised air to a cathode of a fuel cell, characterised in that it comprises the following steps:

- compressing, via a compressor driven by a motor, air originating from an air inlet pipe, and carrying that pressurised air to an inlet of the cathode,
- expanding, via an energy recovery turbine, water-laden air originating from an outlet of the cathode,
- directing at least some of the expanded air, referred to as the exhaust air of the turbine, laden with water in the form of suspended liquid droplets, to a casing of the compressor motor so as to cool said motor casing and said motor.

Advantageously, the supply method according to the invention is implemented by a supply device according to the invention.

Advantageously, the supply device according to the invention implements the supply method according to the invention.

The invention also relates to a fuel cell system comprising a fuel cell comprising a cathode and an anode, characterised in that it comprises a device for supplying pressurised air to the cathode according to the invention.

The invention also relates to a vehicle comprising a fuel cell comprising a cathode and an anode, characterised in that it comprises a device for supplying pressurised air to the cathode of the fuel cell according to the invention.

The vehicle is for example an automobile, aeronautical, maritime or rail vehicle.

The invention also relates to a supply device, a supply method, a fuel cell system, and a vehicle that are characterised in combination by all or some of the features mentioned above or below.

LIST OF FIGURES

Further aims, features and advantages of the invention will become apparent upon reading the following description, which is provided solely by way of non-limiting example, and which refers to the accompanying drawings, in which:

FIG. 1 is a schematic view of a device for supplying pressurised air to a cathode of a fuel cell in accordance with one embodiment of the invention.

DETAILED DESCRIPTION OF ONE EMBODIMENT OF THE INVENTION

For the sake of illustration and clarity, scales and proportions are not strictly adhered to in the drawings.

Moreover, identical, similar, or analogous elements are denoted using the same reference signs throughout the drawings.

FIG. 1 schematically illustrates a supply device 10, arranged to supply pressurised air to a cathode 110 of a fuel cell 100. The fuel cell 100 comprises, in a known manner, an anode 102 supplied with hydrogen via an anode inlet 104 and discharging the excess hydrogen via an anode outlet 106. The anode 102 is separated from the cathode 110 by a membrane 108.

The cathode 110 comprises a cathode inlet 112 supplied with pressurised air and a cathode outlet 114 discharging the residues of the pressurised air after reaction in the fuel cell 100, said residues forming an oxygen-depleted, water-laden air, which is called water-laden air.

The anode 102 is supplied with hydrogen by a hydrogen supply device, not shown.

The cathode 110 is supplied with pressurised air, in particular by a compressor 12 supplied with air by an air inlet pipe 14. The air originating from the air inlet pipe 14 is for example outside air, or air originating from another system on-board the vehicle which carries the fuel cell and the pressurised air supply device 10. For example, in an aircraft, air can be taken from a propulsion engine or from an air conditioning system.

The compressor 12 is rotated by a motor 16 surrounded by a casing 18. The motor rotates a transmission shaft 19 to which the compressor 12 is connected.

The pressurised air 20, compressed by the compressor 12, is transmitted either directly to the cathode 110 of the fuel cell 100, or, as shown in this embodiment, first passes through a heat exchanger 22, forming the hot pass of this heat exchanger 22, to cool the pressurised air 20.

The pressurised air enters via the cathode inlet 112 and then passes through the cathode 110. The oxygen of the pressurised air supplies the reaction in the fuel cell with hydrogen to generate electricity.

Due to the reaction taking place in the fuel cell, the air leaving the cathode via the cathode outlet 114 is oxygen-depleted, water-laden air. The water-laden air 24 can be used, in this embodiment, as a cold pass of the heat exchanger 22 in order to cool the pressurised air 20.

The water-laden air 24 is then expanded by an energy recovery turbine 26 of the supply device 10. The energy recovery turbine 26 makes it possible to recover energy from the water-laden air 24, by expanding and cooling this water-laden air 24 and by condensing this water into the form of liquid droplets. In this embodiment, the energy recovery turbine 26 is connected to the transmission shaft 19 in order to reduce the energy consumption of the motor 16 when driving the compressor 12. The turbine 26, the motor 16 and the compressor 12 together form a motorised turbocharger.

In the prior art, the air leaving the energy recovery turbine is discharged to the outside after energy recovery.

In the inventive device for supplying the cathode, the air leaving the turbine, referred to as the water-laden exhaust air, is used as a cooling source.

In particular, as shown in this embodiment, the water-laden exhaust air 28 leaving the turbine 26 reaches a bifurcation 30. The bifurcation comprises an inlet connected to the outlet of the turbine 26 and makes it possible to direct some of the water-laden exhaust air 28 towards a first outlet toward a cooling channel 32, and the other portion of the exhaust air 28 to a first exhaust outlet 34*a* to discharge it outwards.

The part of the water-laden exhaust air 28 circulating in the cooling channel 32 is directed to the casing 18 of the motor in order to cool the motor casing 18 and the motor 16. To facilitate cooling, the casing 18 of the motor may comprise fins (not shown) or any other device improving the heat exchange. The droplets of water suspended in the exhaust air 28 directed to the motor casing 18 improve the cooling by vaporization of these droplets under the effect of the heat generated by the motor 16 in order to drive the compressor 12. After cooling the motor 16 and the motor casing 18, the air is discharged via a second exhaust outlet 34*b*, which may be different from the first exhaust outlet 34*a* or be connected thereto so as to form a single exhaust outlet.

The bifurcation 30 can be configured so that the majority of the water present in the exhaust air 28 is directed toward the cooling channel 32.

The bifurcation 30 allows passive control of the pressure drop at the cooling channel 32 and the motor casing 18; the pressure at the two exhausts is the ambient pressure and the pressure at the bifurcation 30 is the same for the part of the water-laden exhaust air 28 circulating in the branch of the cooling channel 32 and the part of the exhaust air 28 circulating in the branch leading to the first exhaust outlet 34*a*, which makes it possible to balance the flow rates between the two branches.

The supply device and the fuel cell form a fuel cell system that can be integrated in an automobile, rail, maritime or aeronautical vehicle. In an aircraft, the fuel cell system may be integrated into an air conditioning system.

The invention claimed is:

1. A device for supplying pressurized air to at least one cathode of at least one fuel cell comprising:

an air inlet pipe, a compressor connected to the air inlet pipe and to an inlet of the cathode, configured to receive air originating from the air inlet pipe, to compress the air originating from the air inlet pipe and to supply pressurized air to the cathode, motor connected to the compressor by a transmission shaft, configured to drive the compressor and surrounded by a casing, an energy recovery turbine connected to an outlet of the cathode, and configured to expand the water-laden air originating from the outlet of the cathode to supply expanded air via an outlet of the turbine, referred to as water-laden exhaust air, and, a cooling channel connecting the outlet of the turbine-and the casing of the motor, said cooling channel being configured to receive at least some of the water-laden exhaust air in the form of liquid droplets in suspension, so as to cool the motor casing and the motor with said portion of the water-laden exhaust air.

2. The supply device according to claim 1, wherein the energy recovery turbine is arranged on the transmission shaft.

3. The supply device according to claim 1, wherein the device comprises a bifurcation arranged between the outlet of the turbine and the cooling channel, the bifurcation comprising an inlet configured to receive the water-laden exhaust air, and comprising at least two outlets, a first outlet configured to direct some of the flow of water-laden exhaust air to the cooling channel, and a second outlet configured to direct another portion of the flow of water-laden exhaust air to an exhaust outlet of the supply device.

4. The supply device according to claim 3, wherein the bifurcation is configured so that a majority of the water in the water-laden exhaust air is directed to the cooling channel.

5. The supply device according to claim 1, wherein the casing of the motor comprises cooling fins.

6. A method for supplying pressurized air to a cathode of a fuel cell, comprising the following steps:

compressing, via a compressor driven by a motor, air originating from an air inlet pipe, and carrying that pressurized air to an inlet of the cathode, expanding, via an energy recovery turbine, water-laden air originating from an outlet of the cathode, and directing at least some of the expanded air, referred to as the exhaust air of the turbine, laden with water in the form of suspended liquid droplets, to a casing of the compressor motor so as to cool said motor casing and said motor.

7. A fuel cell system comprising a fuel cell comprising a cathode and an anode, comprising a device for supplying pressurized air to the cathode comprising:

an air inlet pipe, a compressor connected to the air inlet pipe and to an inlet of the cathode, configured to receive air originating from the air inlet pipe, to compress the air originating from the air inlet pipe and to supply pressurized air to the cathode, a motor connected to the compressor by a transmission shaft, configured to drive the compressor and surrounded by a casing, an energy recovery turbine connected to an outlet of the cathode, and configured to expand the water-laden air originating from the outlet of the cathode to supply expanded air via an outlet of the turbine, referred to as water-laden exhaust air, and, a cooling channel connecting the outlet of the turbine and the casing of the motor, said cooling channel being configured to receive at least some of the water-laden exhaust air in the form of liquid droplets in suspension, so as to cool the motor casing and the motor with said portion of the water-laden exhaust air.

* * * * *